United States Patent [19]
Ledergerber et al.

[11] 3,715,938
[45] Feb. 13, 1973

[54] METHOD OF CONTROLLING A CYCLE OF OPERATIONS FOR MACHINING A ROTARY WORKPIECE

[75] Inventors: Alfred Ledergerber, Bielefeld; Walter Plassmeier, Hiddesen near Detmold, both of Germany

[73] Assignee: Werkzeugmaschinenfabrik Gildemeister & Comp Aktiengesellschaft, Bielefeld, Germany

[22] Filed: Oct. 28, 1970

[21] Appl. No.: 84,856

[30] Foreign Application Priority Data

Oct. 31, 1969 Germany............P 19 54 845.9

[52] U.S. Cl................82/1 C, 318/571, 235/151.11
[51] Int. Cl. .................................................B23b 1/00
[58] Field of Search.................82/2 B; 318/39, 571; 235/151.11

[56] References Cited

UNITED STATES PATENTS

| | | |
|---|---|---|
| 3,573,588 | 4/1971 | Geyer et al............................318/571 |
| 3,548,172 | 12/1970 | Centner et al..........................82/2 B |
| 3,259,023 | 7/1966 | Rieger et al. ........................318/39 X |

*Primary Examiner*—Leonidas Vlachos
*Attorney*—Michael S. Striker

[57] ABSTRACT

A method for machining a rotary workpiece in radial and axial directions under the control of electronic program control means in which the maximum and minimum permissible reference values are stored, and which responds to signals of measuring devices representing the torque applied by the main spindle and workpiece to the cutting tool, advance rates of the tool, the cutting force, and other operational data. When the tool cuts into the workpiece, the increased torque is measured and the rate of rapid feed of the tool reduces, or the tool is stopped, so that the tool is freed of the workpiece, whereupon the tool is advanced so that the measured torque increases to a maximum, whereupon the direction of movement is changed and the work piece is machined until the cutter no longer engages the work piece.

22 Claims, 23 Drawing Figures

Sign Reversal of $\frac{dMd}{dx}$ at $r+$

Variation of $\dfrac{d\,Md}{dx}$

METHOD OF CONTROLLING A CYCLE OF OPERATIONS FOR MACHINING A ROTARY WORKPIECE

BACKGROUND OF THE INVENTION

The present invention relates to a method for adaptively regulating and controlling machining operations of a rotary workpiece in an automatic program controlled machine, particularly a lathe, wherein the adaptive regulation and control is carried out by means of at least one measuring device for the torque between the workpiece and a cutting tool, in connection with an electronic, preferably digital, control means into which the desired finished contour of the workpiece has been introduced and stored, while during the machining operations, the actual contour of the workpiece is compared with the stored desired finished contour.

Methods for adaptive regulation of a sequence of machining operations is known for milling machines in which the cutting operations are adaptively regulated. The known methods are not suitable for automatically obtaining the optimal conditions during machining of a rotary workpiece.

In one of the known methods, optimal machining conditions are determined by a calculator, but it is not possible to influence the cutting conditions during the machining operations so that optimal conditions can only be reached to a certain degree.

SUMMARY OF THE INVENTION

It is one object of the invention to improve the methods of the prior art, and to provide a method for adaptive regulation and control of machining operations carried out on a rotary workpiece in which independently of the contour of the workpiece blank and of the machining allowance, the desired finished contour of the workpiece can be obtained in the shortest possible time while the available power is used with the greatest possible efficiency, and the costs of programming are kept low.

In accordance with the invention the torque at the workpiece is measured by a device provided either at the main working spindle, or at the tool holder, and the measured torque is transmitted in the form of a signal to program control means in which the maximum and minimum reference values are stored. A method of the invention comprises the steps of:

a. moving a cutting tool in a rapid feed in axial direction toward a workpiece until the tool cuts into the workpiece whereby the torque required for rotating the workpiece is increased;

b. measuring the increased torque, reducing in response to the increased torque the rate of rapid feed to a minimum advance rate stored in the program control means, or stopping the advance of the tool during at least one revolution of the workpiece so that the tool becomes free of the workpiece;

c. advancing the freed tool in the axial direction at an advance rate less than the maximum advance rate stored in the program control means so that the measured torque increases to a maximum torque stored in the program control means; and d. changing the direction of movement of the tool from the axial direction to a radial direction and cutting the workpiece with the tool in said radial direction until at the end of the radial movement, the cutting edge of the tool no longer fully engages the workpiece so that the torque is reduced.

Further steps of the method comprise:

e. continuing movement of the tool when the torque is reduced;

f. reducing the advance rate of the tool when the maximum torque is reached and measured so that the same is not exceeded, and reducing in the event that a minimum advance rate is reached, the depth of cut by moving the tool at an advance rate correlated with the reduced depth of cut, but increasing the advance rate in the axial direction if the depth of cut is reduced without exceeding the maximum torque;

g. automatically increasing in response to the torque reduction the rate of advance to a predetermined maximum advance rate stored in the program control means, and upon a further reduction of the torque, adding an advance correlated with an increased depth of cut, and reducing the advance in the axial direction upon an increase of the depth of cut so that the programmed maximum torque is not exceeded;

h. said advance correlated with said increase of the depth of cut and said advance in the axial direction having such a ratio that, during the movement of the tool for increasing the depth of cut, a secondary cutting edge of the tool does not engage the workpiece surface cut by a primary cutting edge of the tool.

If an outer surface of the workpiece is machined, the workpiece is cut in the radial direction as set forth in section (d) until at an increased radius of the cut and at the corresponding increase of the torque, the minimum advance rate is reached, whereupon a reduction of the depth of cut is started by moving the tool at an advance rate corresponding to the depth of cut whereby the advance rate in the radial direction and the torque are increased unless at the end of the radial movement the tool no longer fully engages the workpiece. If the torque is reduced, as set forth in section (e) the movement of the tool is continued in the axial direction.

If an inner surface of the workpiece is machined, when the measured torque is reduced more than is proportional during a cut due to the fact that the tool no longer fully engages the workpiece, the direction of advance is changed from the radial direction to the axial direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 8b to 10b are diagrams illustrating the variation of the advance rate of the tool during machining in radial direction.

DESCRIPTION OF PREFERRED METHODS

Figure 1:
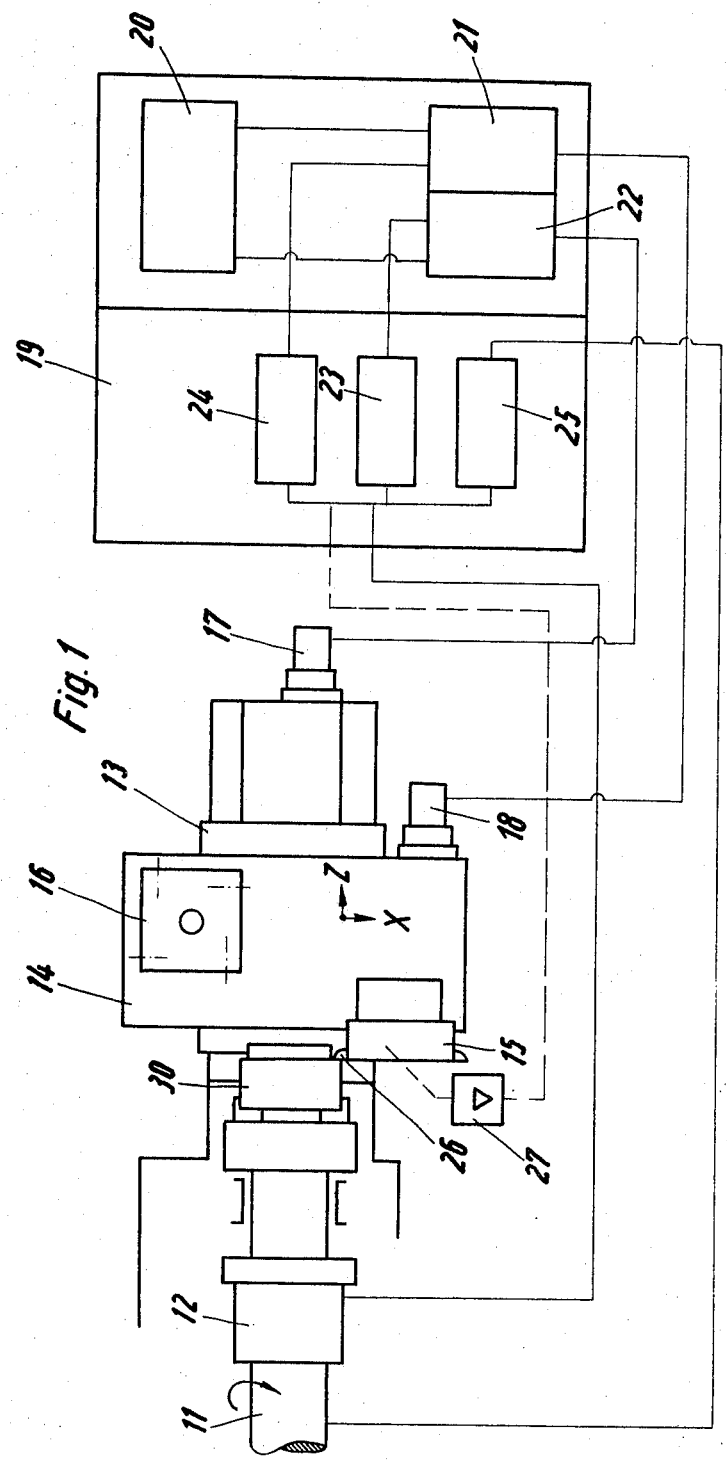
FIG. 1 is a schematic view illustrating an automatic lathe and including a circuit diagram of program control means.

In the following description, and in the drawings, symbols and abbreviations are used which are explained in the following table:

$a$ depth of cut
$a_o$ depth of cut determined after cutting into the workpiece
$a_1$ depth of cut after reduction
$s$ advance for each workpiece revolution
$x$ coordinate in radial direction
$z$ coordinate in axial direction
$-x$ coordinate in radial direction toward the workpiece
$+x$ coordinate in radial direction away from the workpiece
$-z$ coordinate in axial direction toward the workpiece
$+z$ coordinate in axial direction away from the workpiece
H N clearance angle of a secondary cutter edge
$-z'_{min}$ minimum permissible, programmed advance rate in axial direction toward the workpiece
$-z'_{max}$ maximum permissible programmed advance rate in axial direction toward the workpiece
$+z'_{min}$ minimal permissible programmed advance rate in axial direction away from the workpiece
$+z'_{max}$ maximal permissible programmed advance rate in axial direction away from the workpiece
$-x'_{min}$ minimal permissible programmed advance rate in radial direction toward the workpiece
$-x'_{max}$ maximal permissible programmed advance rate in radial direction toward the workpiece
$+x'_{min}$ minimal permissible programmed advance rate in radial direction away from the workpiece
$+x'_{max}$ maximal permissible programmed advance rate in radial direction away from the workpiece
$Md_{max}$ maximal permissible programmed torque at the main spindle
$r$ radius of the workpiece
$r^+$ the radius of the workpiece at the tip of the cutter where during machining of the outer workpiece surface the radial working direction is changed to an axial working direction
$r^{++}$ the radius of the workpiece at the tip of the cutter where during machining of the inner workpiece surface the radial working direction is changed to an axial working direction
$dMd/dt$ the differential quotient of the torque Md derivative with respect to the time t
$dx/dt$ the differential quotient of the distance of movement $x$ derivative with respect to time, also speed in the direction $x$
N cutting performance
$P_H$ main cutting force
$k$ a constant
$\omega$ angular velocity The automatic lathe shown in FIG. 1 has a main spindle 11, a torque measuring device 12 which may be of the type described in the U. S. patent application Ledergerber et al., filed June 18, 1970, Ser. No. 47,509, a slide 13 movable in axial direction, and a cross slide 14 mounted on slide 13 for transverse radial movement. A tool carrier 15 for the machining of outer surfaces, and a tool carrier 16 for machining inner surfaces of a workpiece are mounted on cross slide 14.

A setting motor 17 drives the slide 13, and a setting motor 18 drives the slide 14. The two setting motors are preferably electro-hydraulic stepping motors of known construction.

Program control means 20 including control devices 21 and 22 for the radial and axial directions $x$ and $z$, and additional control means 23 for the advance rate, 24 for the depth of cut, and 25 for the rotary speed of the main spindle 11 are arranged in a casing 19.

Tool carrier 15 supports cutting tools whose main cutting force is transmitted by a measuring transmitter 27 to the control means 20, 21, 22. The torque measuring device 12 also transmits measured values to the control means.

The desired contour of the finished workpiece is entered and stored in the control means. During the machining of the workpiece, the actual contour of the workpiece is continuously compared with the desired contour, and only when the actual contour of the workpiece corresponds to the desired contour, with a machining allowance for finishing operations, the finishing operations can start.

Figure 2:
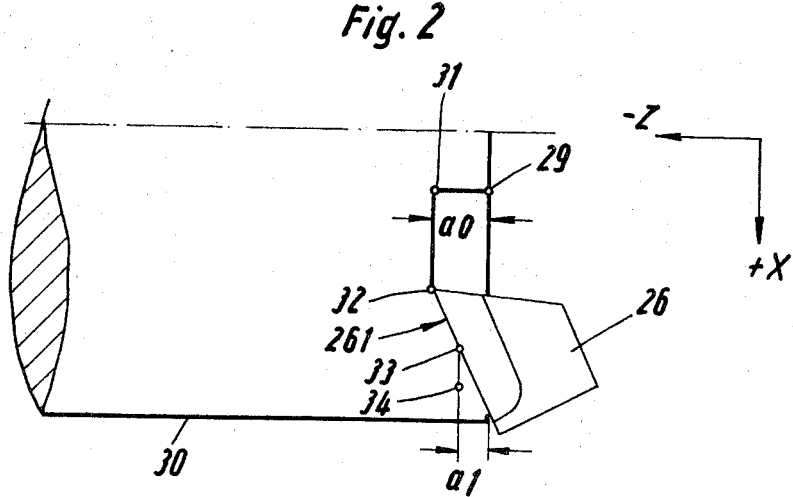
FIG. 2 AND 3 are fragmentary schematic views illustrating the cutting of a cutter into a workpiece for machining an end face.
Figure 2A:
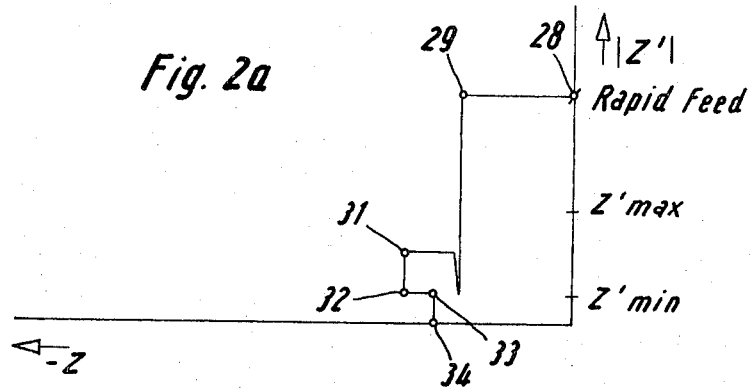
FIG. 2a is a diagram illustrating the advance of the tool in axial direction after cutting into the workpiece as shown in FIG. 2.
Figure 2B:
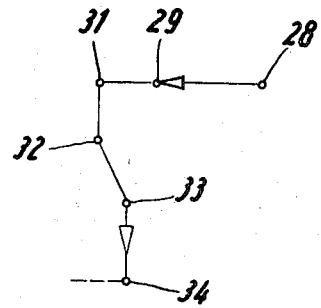
FIG. 2b is a schematic diagram illustrating the path of the cutter during cutting into the workpiece and machining the end face of the workpiece shown in FIG. 2.
Figure 3:
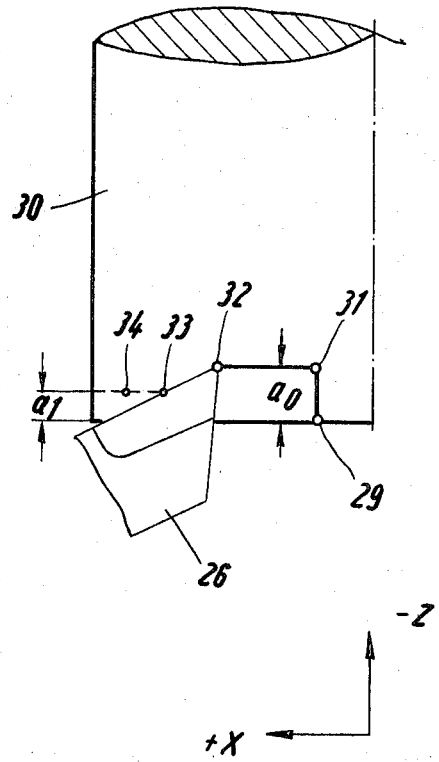
Figure 3A:
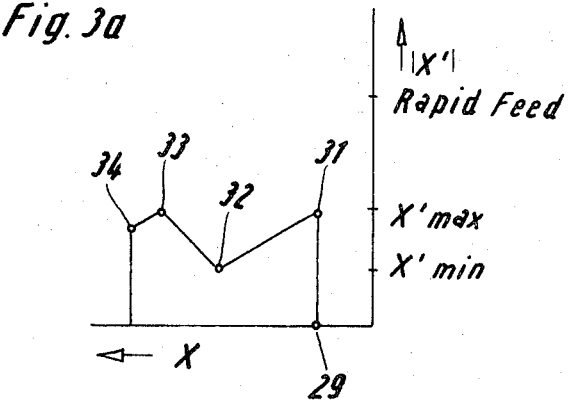
FIG. 3a is a diagram illustrating the advance of a tool for cutting into a workpiece as shown in FIG. 3.
Figure 5:
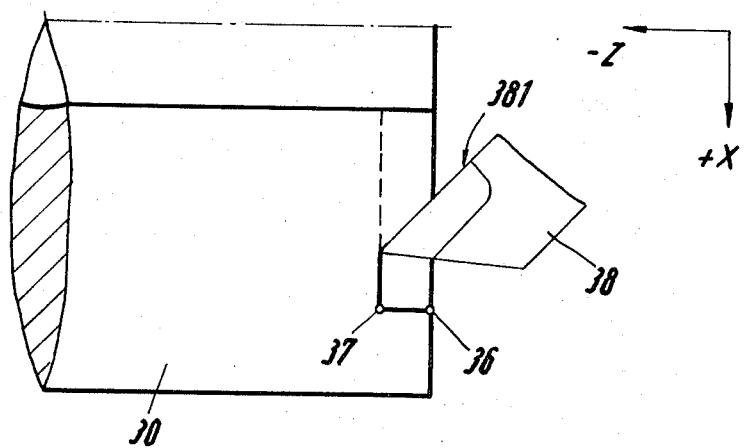
FIG. 5 illustrates the cutting into a workpiece by a tool for machining an end face, followed by machining of an inner surface.
Figure 5A:
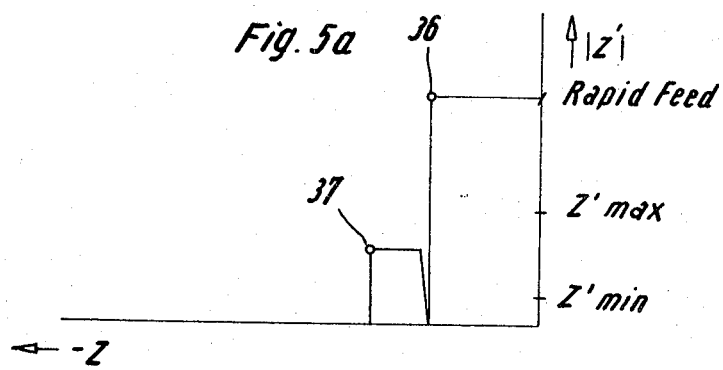
FIG. 5a is a diagram illustrating the advance of the tool in axial direction according to FIG. 5.

FIGS. 2 and 3, and the related FIGS. 2a, 2b and 3a illustrate the cutting of an outer surface of a workpiece 30 by a cutter 26, and FIG. 5 illustrates the cutting of an inner surface of the workpiece 30 by cutter 26. For both operations, the cutter 26 starting from a starting position 28, in which it is located in at least one axis at the height of the finished contour of the workpiece 30, is moved in a rapid feed toward the workpiece 30. In both operations, it is assumed that the cutter 26 has reached the start position in the x axis, which extends in a radial direction of the workpiece, and is then moved in a rapid feed in the direction $-z$, that is in axial direction toward the workpiece 30 to the point 29 where the cutter 16 cuts into the surface of the same. A consequent increase of the torque is introduced by a corresponding signal into the program control means by which the advance in the axial $-z$ direction is reduced from rapid traverse to the value $-z'_{min}$. As shown in FIGS. 1a, 3a and 5a, this rate of advance is maintained until at the lowest possible rotary speed of the workpiece, the same has completed at least one revolution. This time is used to permit the cutter to cut itself free in the event that the end face of the workpiece is not perfectly planar. For workpieces with very uneven end faces, or under conditions in which the end face wobbles, the advance must be stopped until the cutter is free of the workpiece.

During machining of the outer surface of a workpiece, the advance in the axial direction $-z$ toward the workpiece, is continued after the cutting free of the cutter at an advanced rate which is lower than the programmed maximum advance rate, while the torque increases. A cutter 26 must be used which is designed that when the point of the cutter cuts into the end face of the workpiece, only one cutting edge 261 is operative. This cutting edge 261 is located on the side facing the positive radial direction $+x$, as shown in FIG. 2. When the programmed maximum torque is reached, the advance in the $-z$ axial direction is stopped at point 31, and the advance in the radial direction $+x$ in the direction of the increasing radius of the workpiece, is started with an advance rate whose programmed value must not exceed $x'_{max}$. As the radius of the cutting point increases, the torque is proportionally increased, assuming equal cutting conditions. In the same manner, the cutting speed increases proportionally, disregarding a regulation of the rotary speed. In the event that no adjustment of the rotary speed is considered, the maximum permissible cutting speed must not be exceeded at the maximum cutting radius, which means that at a smaller cutting radius, the cutting speed during the cutting of an end face is not optimal.

In the event that, starting from the above described changeover point 31 to cutting in radial direction, the operation takes place without regulation of the rotary speed, and when during the radial advance and the correlated reduction of the advance rate, the programmed minimum permissible advance rate $x'_{min}$ is reached, for example at a point 32, then the advance in the $+z$ axial direction is added with the minimum permissible value $+z'_{min}$, while the advance in the $+x$ direction is again increased for obtaining the full torque, see FIGS. 2 and 2a. The depth of cut is consequently reduced. When the advance in the radial $+x$ direction reaches at a point 33 the value $+x'_{max}$ stored in the program control means, the added advance $z'_{min}$ acting in the axial $+z$ direction is stopped, and during further cutting operations in the radial $+x$ direction, the advance is reduced so that the torque permissible for the regulation is not exceeded as the radius increases.

Figure 4:
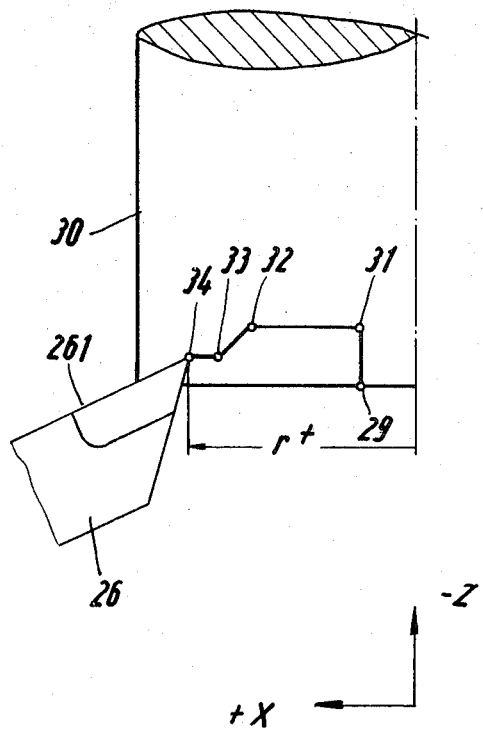
FIG. 4 illustrates a position during the machining of an end face at which the cutter moves in outward direction away from the workpiece.
Figure 4A:
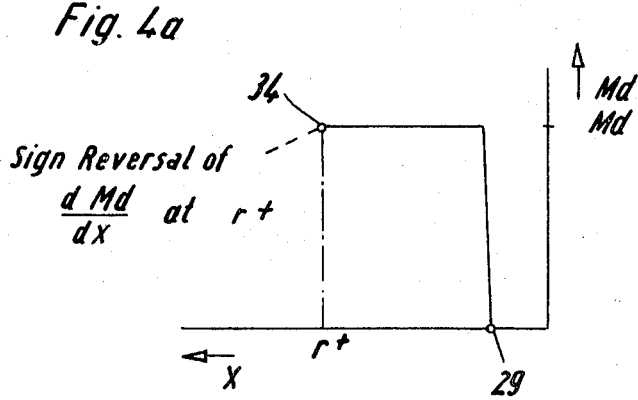
FIG. 4a is a diagram illustrating the variations of the torque under consideration of the changes of the advance rate and of the depth of cut depending on the cutting radius.

When the cutting radius $r^+$ at point 34, where the radial working direction is changed to the axial working direction is reached and $z'$ becomes zero, see FIGS. 4 and 4a, the variation of the torque $Md$, which may be expressed as $dMd/dx$, becomes negative so that a measuring signal is present which effects the change of the advance direction from the radial direction $+x$ to the axial direction $-z$. This measuring signal is also effective if the workpiece blank is so conical that the cutter cuts into the workpiece on the conical face. In this event, the cutting in and the change of the direction of advance, the measured torque will again decrease after reaching the permissible maximal torque whereby the change of the main advance direction is started, as explained above.

In the event that starting from the above-described changeover point 29' from the cutting in of the cutter into the workpiece to the cutting of the end face the operations are carried out at a regulated speed, the cutting speed at this point is first varied until a predetermined cutting speed is obtained, which means that the rotary speed is correspondingly adapted.

In the following equation, N indicates the cutting performance, $P_H$ indicates the main cutting force, $r$ is the cutting radius, $\omega$ is the angular velocity, $a$ is the depth of cut, $s$ is the advance for each workpiece revolution, and $k$ is a constant.

$$N = P_H \cdot r \cdot \omega = a \cdot s \cdot r \cdot \omega \cdot k$$

From this equation follows that, as the radius increases, the angular velocity and the advance for each workpiece revolution must be proportionally reduced, if the cutting speed and the torque are to be constant. The change of the position of the tool carriage in the radial $x$ direction is used as the measured value for regulating the rotary speed. Since in accordance with the above equation, at constant torque and increasing radius, the advance does not change in accordance with the linear function if the removal of chips is irregular, the increase of the radius can be used as comparison value in order to obtain from the ratio of increase $dx'/dt$ divided by $dx/dt$ a measure for the regular proceeding of the cutting of the end face. If a predetermined range of tolerances for $dx'/dt$ divided by $dx/dt$ is exceeded, then this is an indication of the bluntness of the cutter so that the cutting operation must be automatically interrupted.

In the above mathematical expressions, $x'$ represents the programmed advance rate in radial direction, and $x$ the coordinate in the radial direction. The cutting operation may be continued at a reduced depth of cut, as explained above, in the event that this is in accordance with the programmed machining.

The changeover of the main advance direction from the radial direction away from the axis $+x$ to the axial direction toward the workpiece $-z$ takes place as described above when the cutting radius $r^+$ at which the changeover is to take place, is reached. The contour of the workpiece blank, which may be conical, and the programmed finished contour which is, for example, cylindrical, may cause during continuous cutting operation, the cutting of the tool into a zone of the workpiece at which the torque increases so that the advance in the $z$ direction is reduced. This reduction of the advance in the axial $z$ direction is permissible up to a programmed value of $z'_{min}$. When this value is reached then the depth of cut is continuously reduced while the rate of advance $z'$ is increased in accordance with the program. This operation is limited by the programmed ratio between the depth of cut and the advance of the tool during each workpiece revolution. When this limit is reached, it indicates that the tool has become so blunt that it cannot be used any longer, and the operations must be interrupted for replacement of the cutter.

In the event that the regulation of the rotary speed is not included into the adaptive regulation by the program control means, cutting operation in the axial $-z$ direction takes place as explained above. The cutting speed increases and decreases in accordance with the contour of the workpiece. The programmed value of the cutting energy N must be selected under consideration of the cutting speeds occurring during the entire machining of the workpiece. If during cutting in axial direction a zone of the workpiece is reached, in which due to the reduction of the depth of cut the advance rate increases so that the maximum programmed advance rate $z'_{max}$ is reached so that the feed is in the radial direction $+x$, this approach must take place only in the programmed ratio of the programmed advance rate $x'$ and $z'$. This is necessary in order to prevent that the secondary cutting edge 261 of the cutter 26 engages the workpiece during setting of the cutter in the direction of the increased depth of cut.

When an inner surface of the workpiece is to be machined, the following operations take place:

In accordance with FIGS. 5 and 5a, the initial cutting with a suitable cutter 38 for inner surfaces at the point 36 takes place until the cutter has cut itself free.

After freeing of the cutter 38, the advance is started in the axial $-z$ direction at the advance rate $-z'_{min}$, and is maintained until the torque $Md_{in}$, which is permissible for machining an inner surface with the respective tool, is reached at point 37. The programmed axial advance $-z'$ is stopped, and the advance in the radial $-x$ direction started. In the event that no regulation of the rotary speed is provided, as is possible for small variations of the diameter during machining of an inner surface, the advance in the radial $-x$ direction corresponds to the programmed value $-x'$. This programmed value $x'$ which is greater than the programmed minimum advance rate $x'_{min}$ and smaller than the maximum programmed advance rate $x'_{max}$, remains independent of the effective torque during machining of an inner surface, even when the radius varies. Consequently, the load on the cutter remains constant during the variation of the radius. The torque measured at the main spindle of the machine, decreases in accordance with the equation $$Md = x \cdot c$$

as the radius decreases, until the primary cutting edge 381 of cutter 38 reaches the radius $r^{++}$, see FIGS. 3 and 3a. This radius is the radius of the workpiece at the tip of the cutter where during machining of the inner surface of the workpiece, the radial working direction is changed to an axial working direction. At this point, the differential quotient of the equation for $Md$ changes, and this change can be evaluated by the program control means so that the respective signal causes the change of the advance direction from the radial $-x$ direction to the axial $-z$ direction. The value of the differential quotient, and its sensitivity to change is predetermined and programmed. In the axial $-z$ direction, the machining is continued at the advance rate $-z'_{max}$, which is the maximal programmed advanced rate. If during axial machining the torque $Md_{in}$, for example due to a non-cylindrical part of the workpiece on the machined inner surface, reaches the maximum value, the axial advance rate $-2'$ is reduced. This reduction of the advance rate is limited to the programmed minimum advance rate $z'_{min}$ at a maximal permissible torque $Md_{in}$.

If at the axial advance rate $-z'_{min}$, the maximum permissible torque $Md_{in}$ is reached, the depth of the cut is reduced by starting an advance in radial direction at the programmed minimum rate $x'_{min}$. Thereby, the advance rate $-z'$ is increased until $z'$ maximum is reached, and the advance $-x'_{min}$ is again disconnected. When the torque $Md_{in}$ becomes zero, which means that the cutter does not engage the workpiece, the machining of the inner surface is completed, and the cutter is traversed to its initial starting position so that the next operational step can take place, as described above.

If during a main advance of the cutter, the torque increases beyond the programmed permissible value, this is an indication of a blunted and worn off cutter, or of breaking of the cutter, which causes stopping of the machine.

If during the machining of the inner surface of a workpiece,, a continuous cutting is not required, then the program control means recognize the final contour in the axial direction $z$. The cutter is then retracted in the radial direction $-x$ from the cutting point, and returned to the starting position. The following operation takes place as described above.

Figure 6:
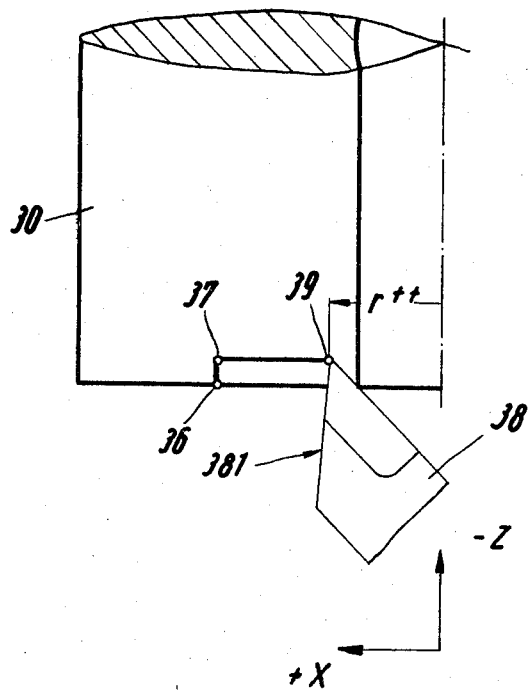
FIG. 6 illustrates a position during machining of an end face in which the cutter moves inward toward the axis of the workpiece and out of the same.
Figure 6A:
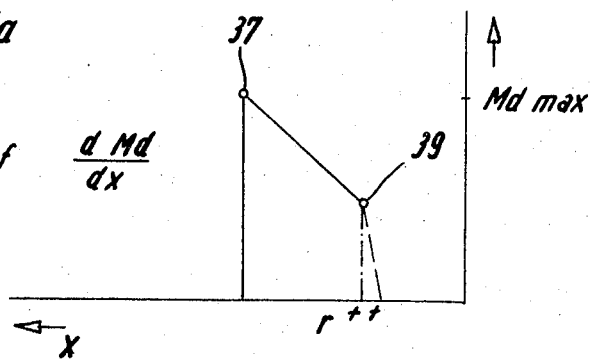
FIG. 6a is a diagram illustrating the variation of the torque without consideration of variations of the advance rate and of the depth of cut.
Figure 7:
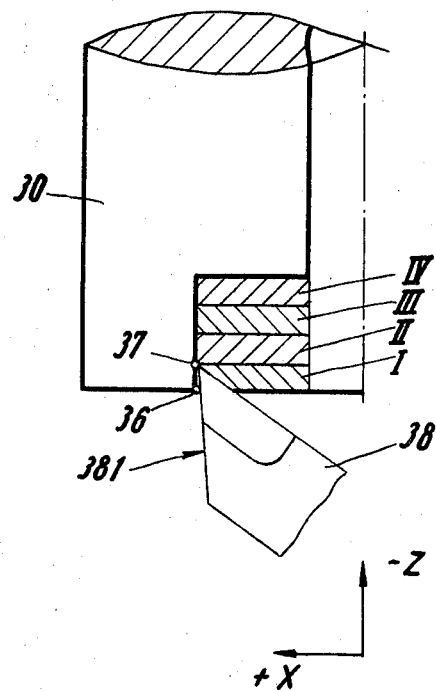
FIG. 7 illustrates recessing operations at an end face of the workpiece.
Figure 7A:
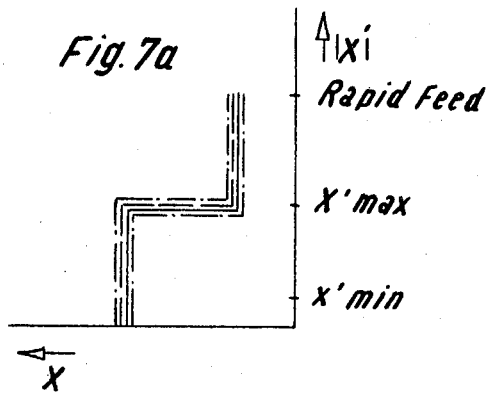
FIG. 7a is a diagram illustrating the change of the advance rate during the operation shown in FIG. 7.

In the event that during the machining of an inner surface no machining in the axial direction, but only hollowing at one end as shown in FIG. 6 is required, the abovedescribed operations can be simplified, as follows:

The start of the cut with the cutter 38 for inner surfaces takes place as described above until the cutter is cut free. After that, the advance in the axial $-z$ direction is started at the programmed minimum advance rate $-z'_{min}$, and is maintained until the minimum permissible torque $Md_{in}$ for machining inner surfaces with the respective cutter 38 is reached. When this value is reached, the programmed advance in axial direction $z'$ becomes zero, and advance of the cutter is started in the radial $-x$ direction. In the event that no regulation of the rotary speed is provided, which is possible for a small variation of the diameter during machining of an inner surface, the advance started in the radial $-x$ direction is a programmed value $-x'$ which is greater than the minimum programmed advance rate $x'_{min}$, and smaller than the maximum programmed advance rate $x'_{max}$, for an inner surface. The programmed advance rate $-x'$ is independent of the existent torque and remains the same during machining of an inner surface, even if the radius changes. Consequently, the load on the cutter remains constant for the entire variation of the cutting radius. When the main cutting edge reaches the radius $r^{++}$, see FIG. 6, in this case the direction of the advance is not changed, so

*that the cutter continues its movement and is disengaged from the workpiece which means that the torque Md becomes zero. The cutter is retracted in the axial +z direction, and the next cutting operation is prepared.*

In the event that end faces having a large radius have to be machined at a high rate of chip removal, the machining operations are changed as follows:

The starting position is in the radial x direction, and the main axis of the spindle is the origin of the x axis. In the axial z direction, the end face of the workpiece determines the start position. Starting from this position, the cutter is first moved in the axial −z direction for setting the two cutters in a position corresponding to the maximum permissible depth of cut for the respective cutter. Thereupon, the cutter is moved in the radial +x direction in a rapid traverse until cutting the workpiece at the inner diameter. An increase of the torque results, whereupon the advance in the radial +x direction is stopped by the program control means, and this condition is maintained until at the lowest possible rotary speed, at least one revolution of the workpiece has taken place. This time is used to obtain a cutting free of cutter 38 in the event that the inner surface of a tubular workpiece is non-circular. After freeing of the cutter, the advance in the radial +x direction, starting from the programmed value +$x'$ is increased in accordance with a stored acceleration function. The upper limit of the advance rate is determined by the programmed value $x'_{max}$, if the maximum permissible torque is not reached.

As the radius increases, the torque proportionally increases, assuming constant cutting conditions. At the same time, the cutting speed increases proportionally, if a regulation of the rotary speed is not considered. In the event that no regulation of the rotary speed is intended for the adaptive regulation, the permissible maximum cutting speed must not be exceeded at the maximum turning radius, which means that at any smaller cutting radius, it is not possible to operate at the optimum cutting speed during machining of an end face of the workpiece.

If, starting from the above-described changeover point 37 from the cutting of the cutter 38 into the workpiece to the machining of the end face of the workpiece, the operation takes place without regulation of the rotary speed, during cutting in radial direction with increasing cutting radius and the correlated reduction of the advance rate, the programmed minimum permissible advance rate $x'_{min}$ is reached, the advance in the axial +z direction is added at the minimum permissible rate +$z'_{min}$ while at the same time the advance rate in the radial +x direction is again increased for obtaining the full torque. As a result, the depth of cut is reduced. When the rate of advance in the radial +x direction reaches a programmed value of $x'_{max}$, then the additional advance $z'_{min}$ in the +z direction is stopped, and during further machining in the radial +x direction, the advance rate is reduced so that the predetermined permissible maximum torque is not exceeded as the cutting radius increases.

When the final contour is approximated, it is recognized, and the cutter is retracted in the axial +z direction. During this machining operation, the travelled distances are compared with the partial finished contour, as explained above, so that the next cut, starting again from the main axis, can take place at the maximum depth of cut. Starting from the main axis of the main spindle is only necessary in the event that the inner diameter of the inner machined surface is reduced in the axial −z direction. If the inner machined surface is cylindrical, the operation can be started at the programmed distance from the recognized partial contour.

If, starting from the above-described changeover point from the cutting of the cutter into the workpiece the rotary speed is regulated during machining of an end face in radial direction, the cutting speed must be brought to a predetermined programmed value, with corresponding adaptation of the rotary speed.

From the above equation:

$$N = P_H \cdot r \cdot \omega = a \cdot s \cdot r \cdot \omega \cdot k$$

follows that, as the radius r increases, the angular speed and also the advance s during each workpiece revolution must be proportionally reduced, if the cutting speed and torque are to be constant. As measuring value for the regulation of the rotary speed, the variation of the position of the carriage on which the cutter is mounted, in the radial direction of the x coordinates is used. Since in accordance with the above equation, the rate of advance changes in a nonlinear function at a constant torque and increasing cutting radius, if the removal of the chips is irregular, the increase of the radius can be used as a reference value for obtaining for the ratio of increase, $dx'/dt$ divided by $dx/dt$, a measure of the regularly proceeding machining of the end face of the workpiece. If a predetermined range of tolerances for $dx'/dt$ divided by $dx/dt$ is exceeded, this is an indication of the cutter becoming blunt, and the cutting operation is automatically interrupted.

In the event that the program permits it, it would be possible to continue the machining operation at a reduced depth of cut, as described above.

When a drilling operation is carried out, and if the tool has a large diameter, the torque measured at the main spindle can be used as a reference value for the variation of the advance rate. For small drills, where the measuring of the torque at the main spindle is not sufficiently sensitive, and also when delicate recessing cutters or similar tools are used, a measuring device for the torque is directly arranged at the tool holders.

In all these conditions, the permissible torque and the minimum permissible rate of advance are used as limiting values for indicating bluntness of the tool so that the same can be withdrawn when the above limits are reached. This is possible since the advance takes place only in the direction of one set of coordinates.

Figure 8:
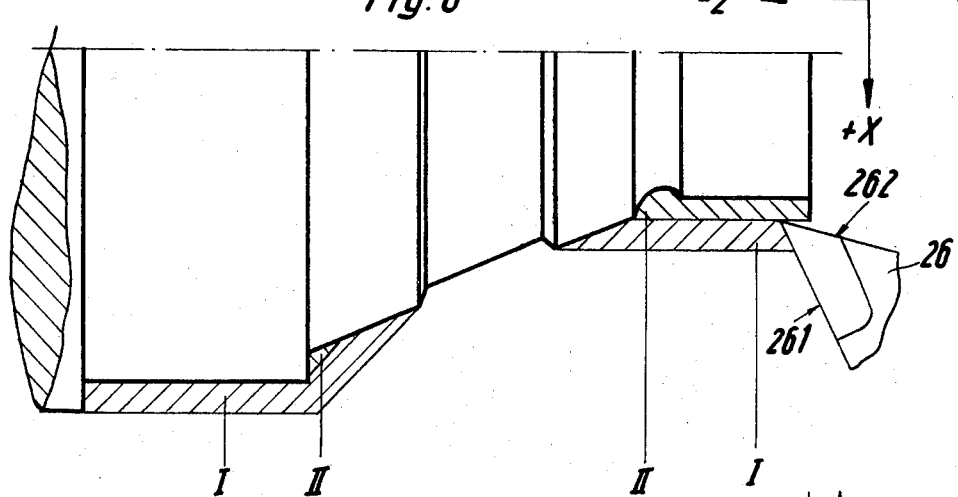
FIGS. 8 to 10 illustrate the machining of different workpieces.
Figure 8A:
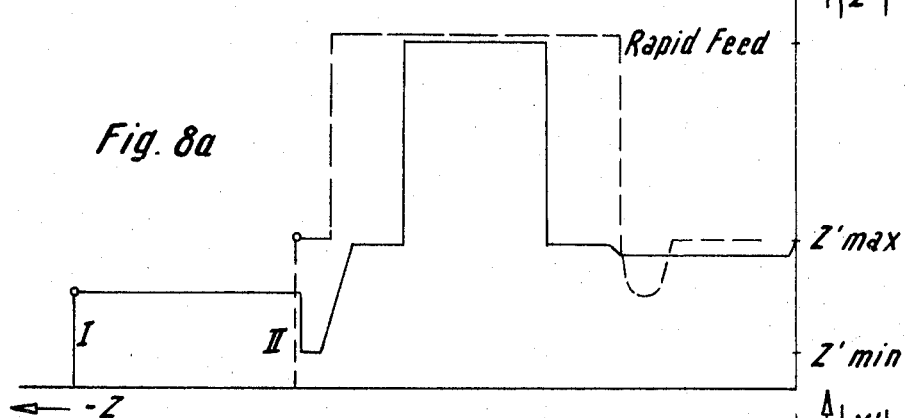
FIGS. 8a and 10a are diagrams illustrating the variation of the advance rate of the tool during machining in axial direction.
Figure 8B:
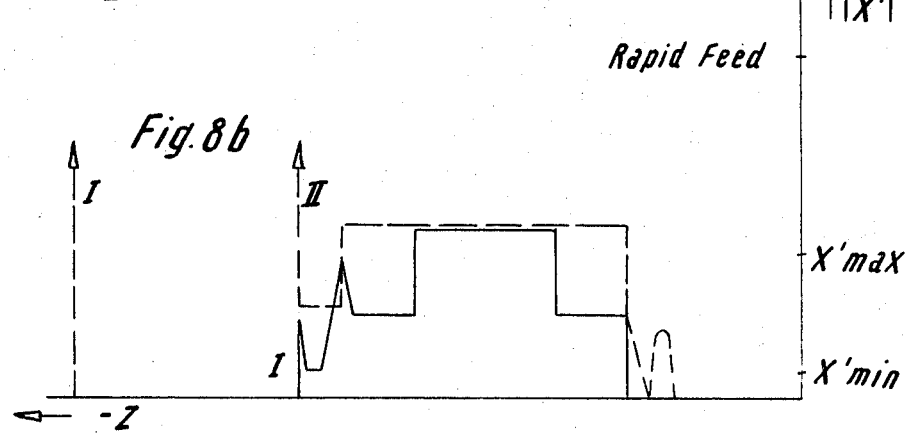

In the example of FIGS. 8, 8a, and 8b, the sequence of machining operations is selected so that during each cutting operation I and II, intermediate already finished zones of the workpiece, or zones having the desired contour, can be freely passed by a rapid transverse of the tool, whereupon the tool is again engaged with the portion of the workpiece which is to be further machined.

Figure 9:
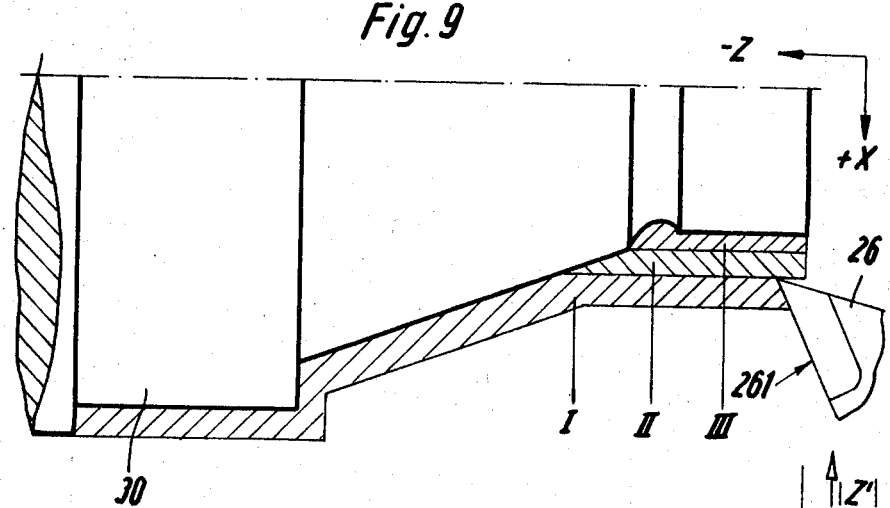
Figure 9A:
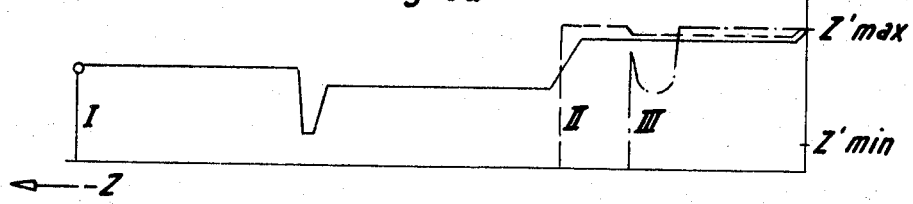
Figure 9B:
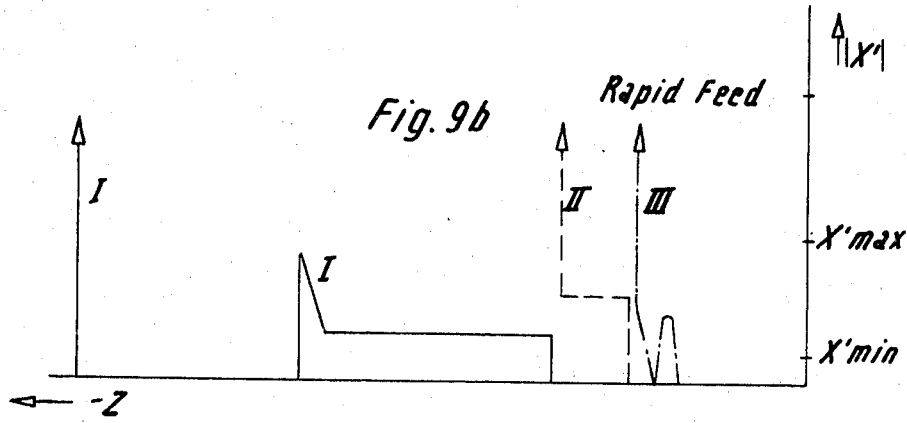

In the example shown in FIGS. 9, 9a, and 9b, the sequence of operations is selected so that the end zone which was finished during the cut I is not again machined during successive operations.

Figure 10:
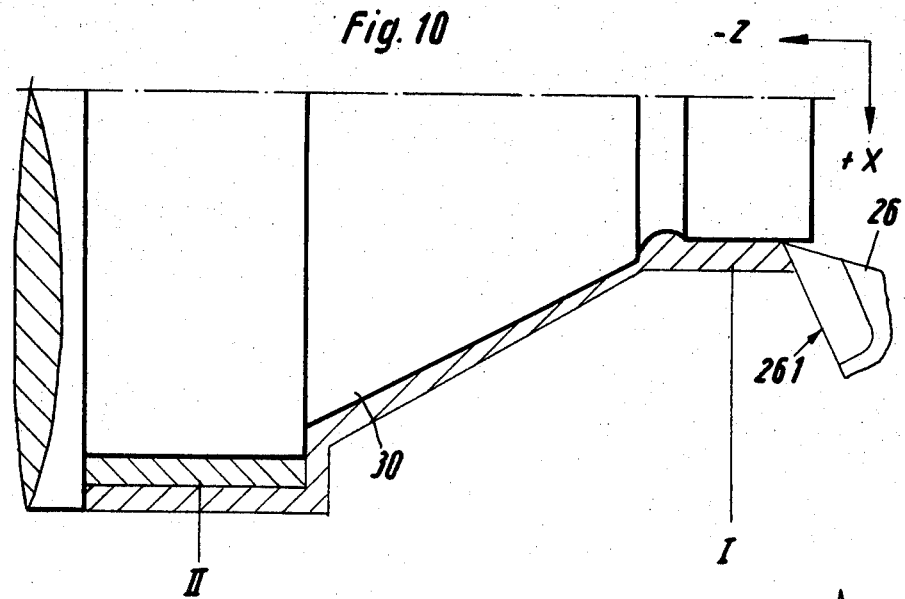
Figure 10A:
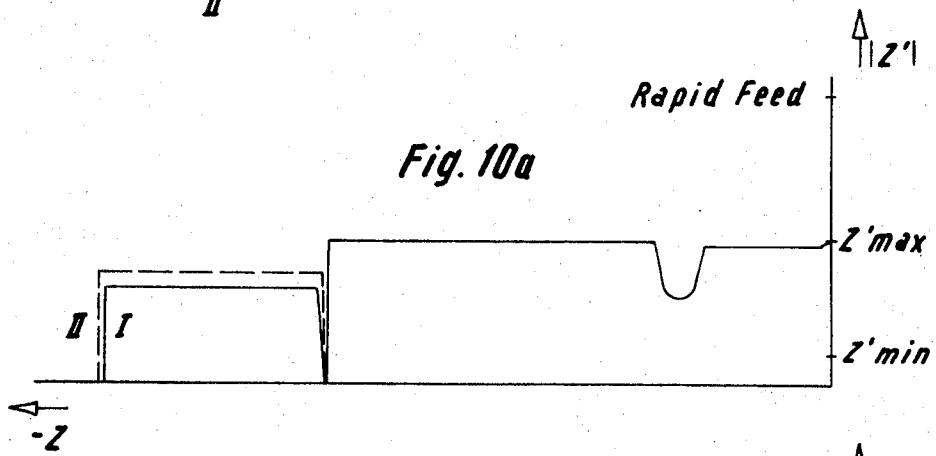
Figure 10B:
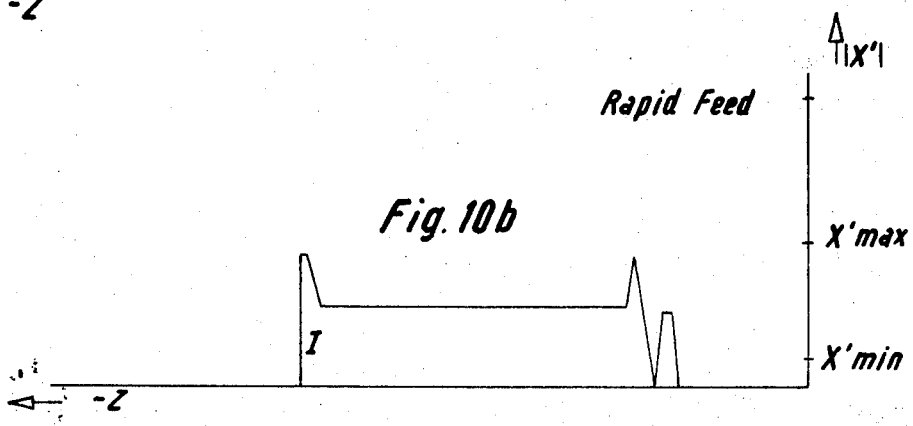

In the example of FIGS. 10, 10a and 10b, after the cut I, the starting point for the following cutting II is automatically placed in a new position at the beginning of a not yet finished zone of the workpiece.

On the basis of the above-described operations, the programming is carried out in such a manner that at a certain auxiliary command, a sequence of machining operations for machining the outer surface of a workpiece, while another auxiliary command causes the program control of another sequence of operation required for machining an inner surface. It is possible to freely select one or the other operation. The program control of the machining operations requires specific maximal permissible torques, maximal and minimal advance rates, permissible rotary speeds, and/or a predetermined range of regulation of the rotary speed at the desired cutting speed. These values are associated with auxiliary command signals so that they can be freely selected and activated.

In the same manner, during rough machining with adaptive regulation and following finishing operations auxiliary command signals interrogate the program control means for the values of $Md_{max}$, $x'_{max}$, $x'_{min}$, $z'_{max}$, $z'$min, the rotary speed, and the range of speed regulation, as required by the respective machining operation.

Depending on the selection of the tool, auxiliary signals, or signals caused by the tools, interrogate the program control means for various permissible values for the torque, $x'_{max}$, $z'_{max}$, $x'_{min}$, $z'_{min}$, range of regulation of the rotary speed, the rotary speed, and the permissible ratio between the depth of cut and the advance for each workpiece revolution.

For the recognition of a reference value, in addition to the device 12 for measuring the torque, see FIG. 1, suitable measuring devices 27, such as expansible strips, or quartz transmitters can be provided at the tools or tool holders. Such measuring devices 12 and 27 are correlated with auxiliary commands so that by means of the auxiliary commands, a desired measuring device can be selected. In a rotary machine tool, such as an automatic lathe with two tool carriages, and two pairs of working planes in which machining operations may take place, each pair of coordinate axes is associated with a measuring location, or one pair of coordinate axes is associated with the measuring location at the main spindle, while a second pair of coordinate axes is associated with a measuring location at the tools, or tool holders. The signal of the measuring device at the tool holder is added to the signal of the measuring device at the main spindle, and thus constitutes a reference value for the permissible torque. In this manner, a simultaneous adaptive regulation is obtained for a lathe having four axes.

All above explained auxiliary command signals can be cleared under the control of the program, or also manually. Elimination of particular undesired reference values, or of a complete sequence of operations can be achieved in this manner.

As explained above, all programmed controlling values can be freely selected within a predetermined range. For each control value, the program has several terminal values so that in this manner, different materials and shapes of the workpiece, different tools, machining of inner and outer surfaces, and rough and finishing machining can be carried out under optimal operational conditions.

During radial machining of an end face of the workpiece, the ratio $dx'/dt$ divided by $dx/dt$ is entered and stored in the program control means. When the cutter becomes blunt, or breaks, this limit value is reached, and the program control means respond to the respective signal to withdraw the cutter and to stop the machine. At unfavorable conditions of the removal of chips, as well as when machining polygonal, or other non-circular workpieces, chatter vibrations may occur, which are measured in a conventional manner by a suitable device for measuring oscillations. A limit value for the chatter frequency is entered into the program control means, and when this frequency is reached, the cutting is carried out in a different manner, or the machine is stopped.

It will be understood that each of the elements described above, or two or more together, may also find a useful application in other types of methods of controlling the cycle of operations during machining of a rotary workpiece differing from the types described above.

While the invention has been illustrated and described as embodied in a method of adaptively controlling by program control means a sequence of operations for machining a rotary workpiece in radial and axial directions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of adaptively controlling a cycle of operations for machining on a rotary machine a workpiece rotating about an axis, wherein a desired contour of the workpiece is stored in electronic program control means, wherein during the cycle of operations the actual contour of the workpiece is compared by said program control means with the desired contour until the workpiece has the desired contour, and wherein the torque applied by the rotating workpiece to a tool is measured and corresponding information supplied to said program control means, the method comprising the steps of moving the tool in a rapid feed in axial direction toward the workpiece until the tool cuts into the workpiece whereby the torque required for rotating the workpiece is increased; measuring the increased torque, reducing in response to the increased torque the rate of rapid feed to a minimum advance rate stored in said program control means and including stopping the advance of the tool during at least one revolution of the workpiece so that the tool is freed of the workpiece; advancing the freed tool in said axial direction at an advance rate less than a maximum advance rate stored in said program control means so that the measured torque increases to a maximum torque stored in said program control means; and changing the direction of movement of the tool from the axial direction to a radial direction and machining the workpiece with said tool in said radial direction until at the end of the radial movement the cutting edge of the tool no longer fully engages the workpiece so that the torque is reduced.

2. The method of claim 1 comprising, after changing the direction of the tool from the axial direction to a radial direction, machining the outside of the workpiece with said tool in said radial direction until at an increased radius of the cut and at an advance rate being reduced corresponding to the increase of the torque, the minimum advance rate is reached, and thereupon starting a reduction of the depth of cut by moving the tool at an advance rate corresponding to the desired depth of cut whereby the advance rate in said radial direction and the torque are increased; and reducing the advance rate when the maximum torque is reached so that the same is not exceeded.

3. The method of claim 2 wherein, if at the end of the radial movement the cutting edge of the tool no longer fully engages the workpiece so that the torque is reduced irrespective of the increasing radius, the tool is moved in the axial direction.

4. The method of claim 1 comprising, after changing the direction of movement of the tool from the axial direction to a radial direction, machining the inside of a workpiece with said tool in said radial direction until the cutting edge of the tool no longer fully engages the workpiece so that the torque is reduced more than is proportional during a cut.

5. The method of claim 4 comprising changing the direction of advance from the radial direction to the axial direction when the torque is reduced more than proportional.

6. The method of claim 1 comprising reducing the advance rate of the tool during movement in axial direction when the maximum torque is reached and measured so that the same is not exceeded, and reducing in the event that a minimum advance rate is reached, the depth of cut by moving the tool at an advance rate correlated with the reduced depth of cut, and increasing, when the depth of cut is reduced, the advance rate in said axial direction without exceeding the maximum torque.

7. The method of claim 1 comprising automatically increasing in response to the torque reduction the rate of advance in axial direction to a predetermined maximum advance rate stored in said program control means and upon reaching the maximum advance rate and a further reduction of the torque, adding an advance correlated with an increase of the depth of cut, and reducing the advance rate in said axial direction upon an increase of the depth of cut without exceeding the programmed maximum torque.

8. The method of claim 1 wherein said advance correlated with said increase of the depth of cut and said advance in the axial direction have such a ratio that, during the movement of the tool for increasing the depth of cut, a secondary cutting edge of the tool does not engage the workpiece surface cut by a primary cutting edge of the tool.

9. The method of claim 1 wherein the contour stored in said electronic program control means and obtained by coarse machining includes a finishing allowance layer; and wherein said finishing allowance layer is removed by a finishing operation.

10. The method of claim 9 wherein said tool includes a coarse cutter for cutting the contour including said layer, and finishing cutter offset from said coarse cutter and positioned to cut the final desired contour stored in said program control means.

11. The method of claim 1 wherein parts of the workpiece finished during a first cutting operation are passed by the tool moving at a rapid traverse rate, and including placing the tool in a cutting position engaging another part of the workpiece.

12. The method of claim 1 comprising stopping the tool so that an end zone of the workpiece finished during a previous cutting operation is not traversed by the tool during a following cutting operation.

13. The method of claim 1 comprising starting cutting operations at a starting point of the workpiece, cutting and finishing a zone following said starting point; and automatically starting an other cutting operation at a starting point advanced to the end of said finished zone.

14. The method of claim 1 wherein the variation of the differential quotient $dMd/dx$ in which $Md$ is the torque, is the basis for a control signal causing said program control means to change the direction of advance of the tool.

15. The method of claim 1 wherein said program control means responds to a change of the ratio between the increase of the advance rate of the tool and the radial distance which the tool moves to measure bluntness of the tool.

16. The method of claim 1 comprising continuing of the radial advance when the cutting tool is freed and no machining in axial direction is programmed so that no torque acts thereon; and wherein ending of the torque causes a signal to said program control means for starting another cutting operation.

17. The method of claim 1 wherein the tool operates on an inner surface of the workpiece; and wherein a signal indicating the ending of the torque is given when the inner surface is completely machined.

18. The method of claim 1 wherein the tool starts radial advance from a starting point located in the axis of the workpiece, and axial advance from a plane spaced from the end face of the workpiece the maximum permissible depth of cut; comprising moving the tool in a rapid feed in radial direction until the tool cuts into the workpiece whereby the torque is increased; and wherein the increase of torque causes a signal for recognition of the inner contour of the workpiece blank so that the rapid feed is terminated.

19. The method of claim 18 comprising increasing the advance rate of the tool in radial direction after cutting free of the tool until at least one of two programmed maximum values is reached, said programmed maximum values including a programmed maximum torque and a programmed maximum advance rate.

20. The method of claim 1 wherein maximum programmed torque and the minimum advance rate cause a signal indicating bluntness of the tool; and comprising retracting of the tool from the workpiece under the control of the program control means when said signal occurs.

21. The method of claim 18 wherein the torque is measured by devices selectively located at the main spindle of the machine, at the tool, and at the tool holder; and comprising selectively interrogating said devices from said program control means by auxiliary signals.

22. The method of claim 21 wherein said machine includes at least two carriages movable in radial and longitudinal directions for advancing and retracting the tool in four working planes, and at least two measuring devices; and comprising adding of the signals generated by said measuring devices in said program control means for obtaining a total as a reference value.

* * * * *